US010327586B2

(12) United States Patent
Beerens et al.

(10) Patent No.: US 10,327,586 B2
(45) Date of Patent: Jun. 25, 2019

(54) PORTABLE HEATER COOKING AND GRILLING GRATE

(71) Applicants: Thomas Leon Beerens, Hougton Lake, MI (US); Faron Jeffrey Beerens, Houghton Lake, MI (US)

(72) Inventors: Thomas Leon Beerens, Hougton Lake, MI (US); Faron Jeffrey Beerens, Houghton Lake, MI (US)

( * ) Notice: Subject to any disclaimer, the term of this patent is extended or adjusted under 35 U.S.C. 154(b) by 156 days.

(21) Appl. No.: 15/448,237

(22) Filed: Mar. 2, 2017

(65) Prior Publication Data

US 2017/0254544 A1 Sep. 7, 2017

Related U.S. Application Data

(60) Provisional application No. 62/303,235, filed on Mar. 3, 2016.

(51) Int. Cl.
| | |
|---|---|
| *F24C 5/20* | (2006.01) |
| *A47J 36/26* | (2006.01) |
| *A47J 37/07* | (2006.01) |
| *F24C 1/16* | (2006.01) |
| *F24C 3/14* | (2006.01) |

(52) U.S. Cl.
CPC ........... *A47J 36/26* (2013.01); *A47J 37/0763* (2013.01); *F24C 1/16* (2013.01); *F24C 3/14* (2013.01); *A47J 2037/0777* (2013.01)

(58) Field of Classification Search
CPC ....................................................... F24C 5/00
USPC .............................................. 126/30, 248, 4
See application file for complete search history.

(56) References Cited

U.S. PATENT DOCUMENTS

| | | | |
|---|---|---|---|
| 2,422,450 A | 6/1947 | Van Daam | |
| 2,467,480 A * | 4/1949 | Hudson | A47J 37/07 126/30 |
| 3,085,350 A * | 4/1963 | Waters | A47K 10/06 126/4 |
| 3,280,813 A * | 10/1966 | Schaenzer | F24C 5/20 126/248 |
| 3,520,290 A * | 7/1970 | Winters | A47J 37/0713 126/25 R |

(Continued)

OTHER PUBLICATIONS

Buddy Burners, Cooktop Grill for Mr. Heater Products, website advertisement, Jan. 9, 2016, 1 page (out of 4), https://web.archive.org/web/20160219220439/http://www.buddyburners.com/, U.S.

*Primary Examiner* — Avinash A Savani
(74) *Attorney, Agent, or Firm* — Northern Michigan Patent Law, PLC

(57) ABSTRACT

A cooking grate assembly configured for use on a portable radiant heater with a front safety grille. The cooking grate assembly has a flat main cooking grate with an upper/inner end and a lower/outer end, a pair of spaced hook tabs extending from the upper/inner end of the grate that attach to an upper part of the grille, and a pair of inwardly-angled key tabs extending from the lower/outer end of the grate. A pair of detachable legs supports the grate from a lower part of the grille, with a rotatable locking connection to the key tabs on the grate at one end and opposed inner and outer hooks at the other end that both support the grate on the grille and provide a nesting flat interlock to the rear face of the grate for storage.

7 Claims, 6 Drawing Sheets

(56) References Cited

U.S. PATENT DOCUMENTS

| | | | | |
|---|---|---|---|---|
| 4,561,418 A | * | 12/1985 | Cairns | A47J 37/0688 |
| | | | | 126/25 A |
| 5,355,558 A | * | 10/1994 | Vertanen | A47J 37/0713 |
| | | | | 126/25 R |
| 8,304,700 B1 | | 11/2012 | Eilers | |

* cited by examiner

PORTABLE HEATER COOKING AND GRILLING GRATE

RELATED APPLICATIONS/PRIORITY BENEFIT CLAIM

This application claims the benefit of U.S. Provisional Application No. 62/303,235, filed Mar. 3, 2016 by the same inventors (Beerens and Beerens), the entirety of which provisional application is hereby incorporated by reference.

FIELD

The subject matter of the present application is in the field of portable cooking and heating devices.

BACKGROUND

Combination space heaters and grills are known. One example is shown in U.S. Pat. No. 2,422,450 to Van Daam. This device provides a horizontal electrical hot plate or grill inside a small cabinet or housing. A door in the lower part of the front wall opens to allow food to be inserted and placed on the grill for cooking or heating. A heated air outlet in the upper part of the front wall provides space heating.

Another example is shown in U.S. Pat. No. 8,304,700 to Eilers. This device is a removable wire cooking grate that can be coupled to the protective grille on the face of a portable radiant propane heater, with a flat cook surface located above and projecting out away from the radiant heating element. The grate has an inner end with pins that engage wires on the upper end of the protective grille, and an outer end with bifurcated swivel legs terminating in hook ends that drop down to engage horizontal wires on the face of the protective grille to lock the rack in a horizontal cooking position. The rack can be stored flat against the protective grille when removed, folded, and secured with separate Velcro® type fastener tabs.

A commercial product similar to that in the Eilers patent was sold under the name "Buddy Burners" at www.buddy-burners.com. This device had a horizontal wire cooking grate secured above and in front of the protective grille on a Mr. Heater® Portable Buddy™ radiant propane heater, with two rear elongated pin type legs inserted through vent holes in the upper housing of the heater, and with a U-shaped front swivel leg having corner indents configured to rest on portions of the heater's protective grille.

BRIEF SUMMARY

The present invention is a portable heater attachment used for grilling and cooking. More specifically, the present invention is a grilling and cooking grate assembly for users to attach to an existing portable heater of the type sold commercially under the Mr. Heater® trademark as the Portable Buddy™ or Big Buddy™ or Hunting Buddy™ radiant propane heaters, or any other portable heater using the same or a similar front protective grille over the heating element(s).

In a first form, the grate assembly comprises a flat main cooking grate with an upper or inner end and a lower or outer end; a pair of spaced hook tabs extending from the upper/inner end of the grate; a pair of inwardly-angled key tabs extending from the lower/outer end of the grate; a pair of separable legs, each leg having an upper end with a keyway configured to rotatably engage a respective key tab when the grate is deployed horizontally, and each leg further having a lower end with opposing inner and outer hooks—an inner grille hook configured to engage a lower part of the protective grille when the grate is deployed horizontally from the heater grille, and an outer grate hook configured to support a lower portion of the grate when the grate and legs are stored vertically against the heater grille.

The upper hook tabs on the grate include leg slots configured to receive and secure the upper ends of the legs therethrough when the grate and legs are stored vertically.

These and other features and advantages of the invention will become apparent from the detailed description below, in light of the accompanying drawings.

DETAILED DESCRIPTION

Figure 1:
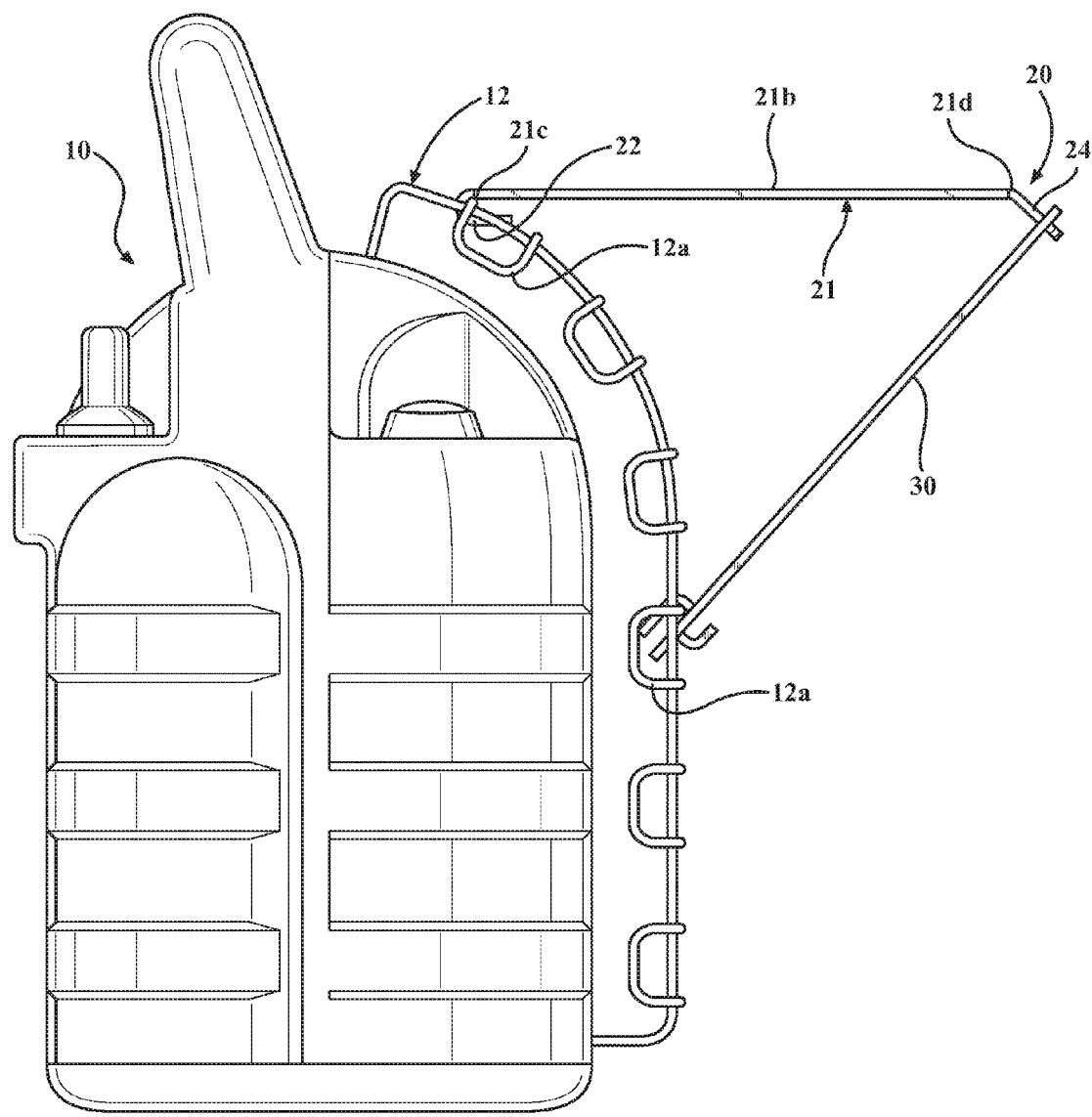
FIG. 1 is a side elevation view of a cooking grate assembly assembled in a horizontal or deployed position on a heater.

Referring first to FIG. 1, a grate assembly 20 according to the invention is shown in exemplary form assembled to a common type of radiant portable propane heater 10, in order to teach how to make and use the claimed invention. The illustrated heater example 10 is a Mr. Heater® Hunting Buddy™ heater that uses common propane cylinders for fuel, with a radiant catalytic burner plate 11 on its front face protected by a safety guard or grille 12 made of steel wire or rod. Grille 12 has a grid of horizontal wires 12a spaced vertically along its face.

Grate assembly 20 has a flat main heat-conductive grate 21 with a pattern of openings or slots 21a interrupting flat cooking surface 21b, although surface 21b could alternately be a solid, unbroken surface for some types of cooking or heating uses. Grate assembly 20 and grate 21 are preferably made entirely of heat-resistant metal, steel being currently preferred, or of any other sufficiently rigid and heat resistant material.

Grate 21 has an upper or inner edge 21c with connecting tab hooks 22 whose hooked portions are curved or angled downwardly relative to the flat cooking surface 21b. Grate 21 has a lower or outer edge 21d with a pair of spaced key tabs 24 extending at a downward or inward angle relative to the flat cooking surface 21b. Connecting tab hooks 22 include slots 22a defining a through axis essentially parallel to the plane of cooking surface 21b. Key tabs 24 each have a pair of opposed indentations or notches 24a formed near their outer ends defining a narrowed neck portion 24b between them.

Grate assembly 20 further includes a pair of detachable legs 30 configured to mate at their upper ends with key tabs 24, and at their lower ends with one or more of the horizontal wires 12a on grille 12.

Each leg 30 has a keyway 32 at its upper end, the keyway comprising a longitudinal slot 32a with an enlarged central aperture 32b. Slot 32a is wide enough for a corresponding key tab 24 to fit slidingly through it when the tab and slot are aligned with one another by holding the leg in a more or less parallel position relative to the plane of grate 21. Central aperture 32b is sized to allow key tab neck portion 24b (and thus the entire leg) to rotate ninety degrees to a vertical position when the end of leg 30 is inserted into slot 32a far enough for neck portion 24b to be even with the aperture 32b.

Each leg 30 also has a pair of dual-opposed support tabs or hooks 34, 36 at its lower end, for example bent metal pieces welded in place on the inner and outer faces of the lower end of the leg. Hooks 34, 36 are dual-opposed in the sense that they are located on opposite sides of the leg, and also in that they open in opposite vertical directions—the inner hook 34 opens downwardly, while the outer hook 36 opens upwardly. Hooks 34 and 36 are shown as L-shaped angular pieces, although other shapes including rounded U- or J-shapes would be possible.

Figure 2:
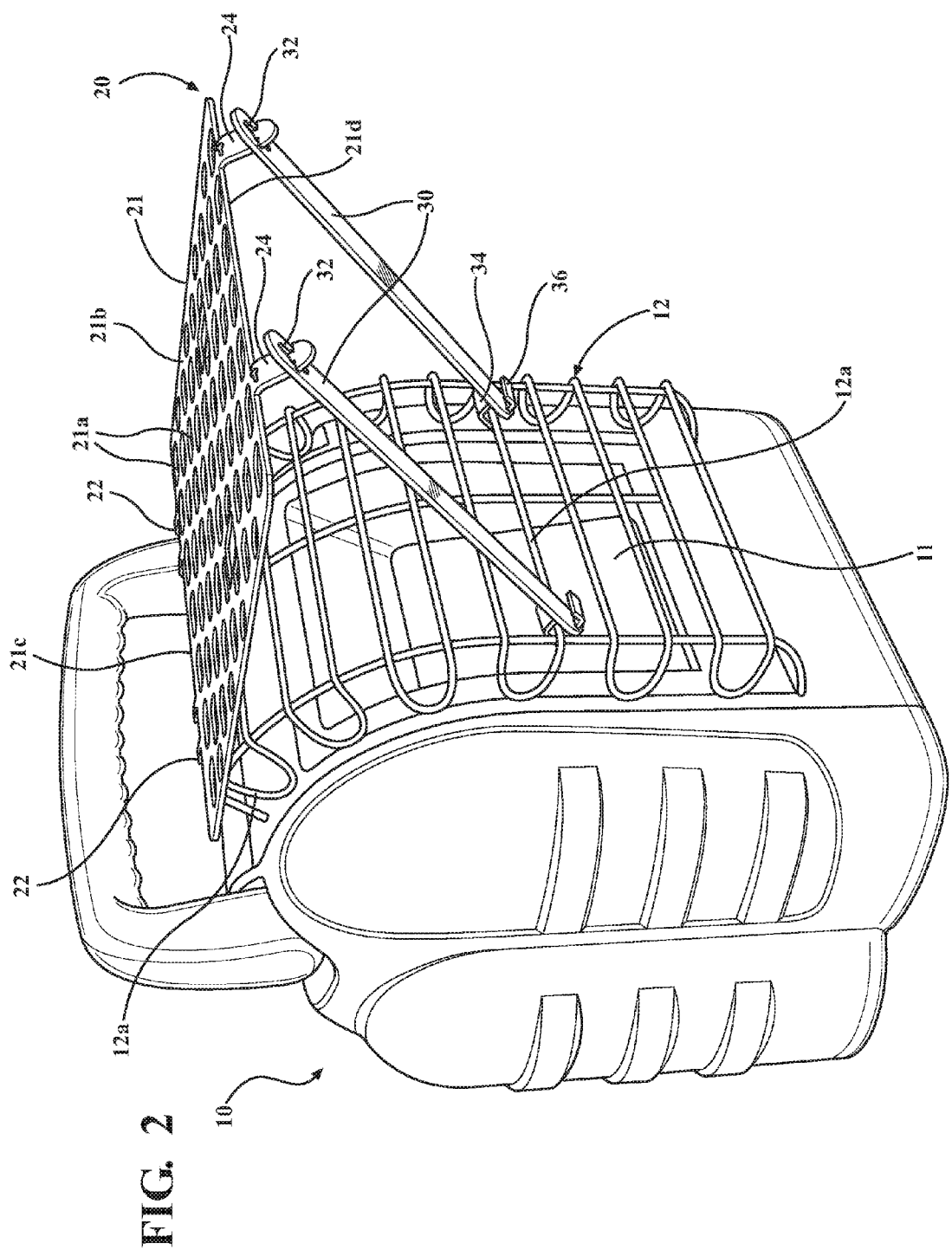
FIG. 2 is a front perspective view of the assembly of FIG. 1.
Figure 5:
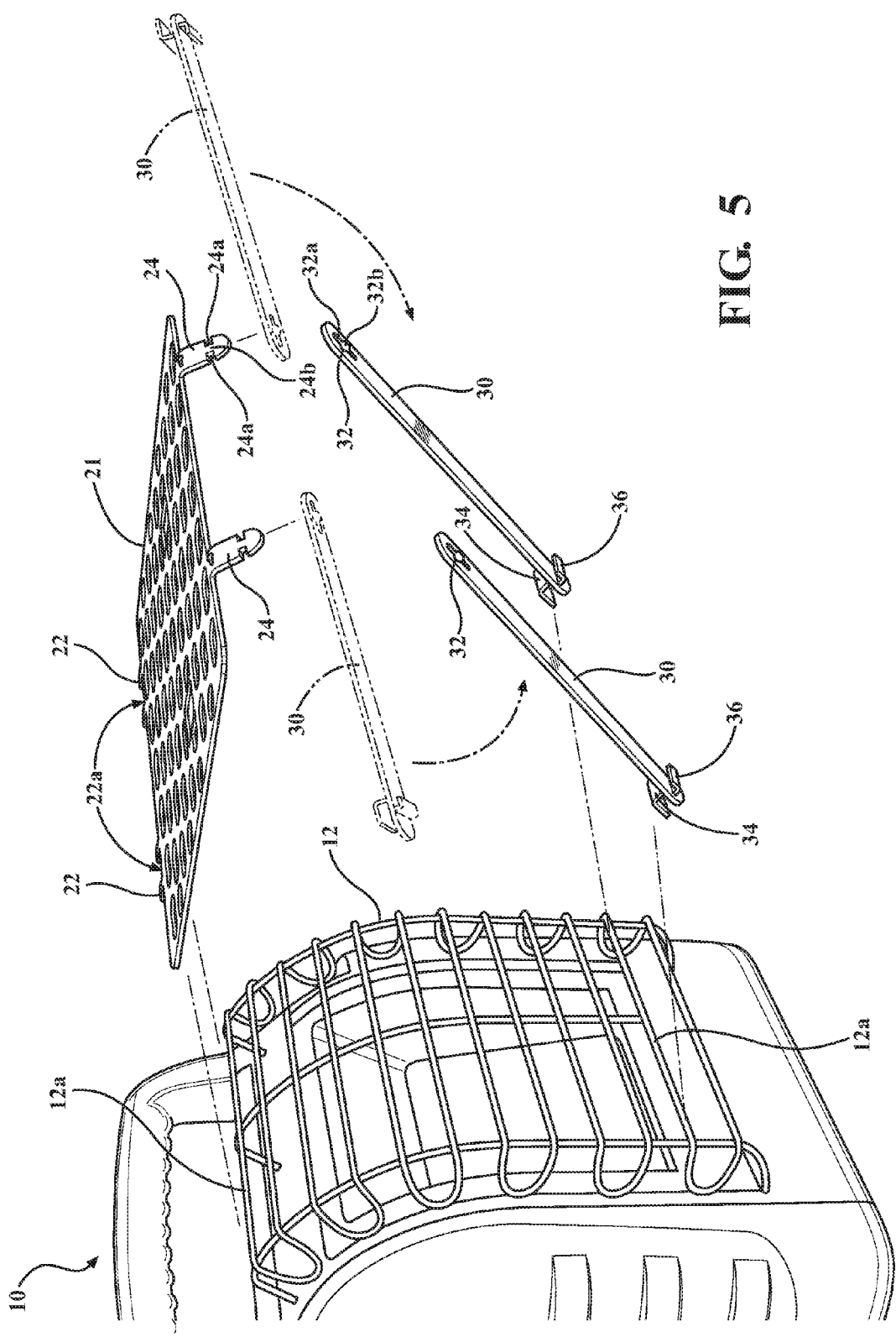
FIG. 5 is a front perspective exploded view of the assembly of FIG. 1.

Referring now to FIGS. 1, 2 and 5, grate assembly 20 is assembled or deployed on heater 10 by engaging upper hook tabs 22 of grate 21 with an uppermost horizontal wire 12a on grille 12, and positioning grate 21 horizontally relative to the substantially vertical front of the heater. Legs 30 are engaged with key tabs 24 on the outer end of grate 21, either before or after the grate is secured to grille 12 with hooks 22, by rotating the legs to a horizontal position in which their keyway slots 32a are aligned with tabs 24, and then sliding them over the tabs far enough to align neck portions 24b with the apertures 32b on the respective legs. Legs 30 are then rotated ninety degrees until substantially vertical, whereupon they are longitudinally locked to tabs 24 by the interference between the misaligned keyway slots 32a on the legs and the notches 24a on the tabs.

The lower ends of legs 30 are secured to a lower portion of grille 12 by engaging the inner hooks 34 with one of the lower horizontal cross-wires 12a, so that the cross-wire 12a supports the outer end of grate 20 via legs 30.

Figure 3:
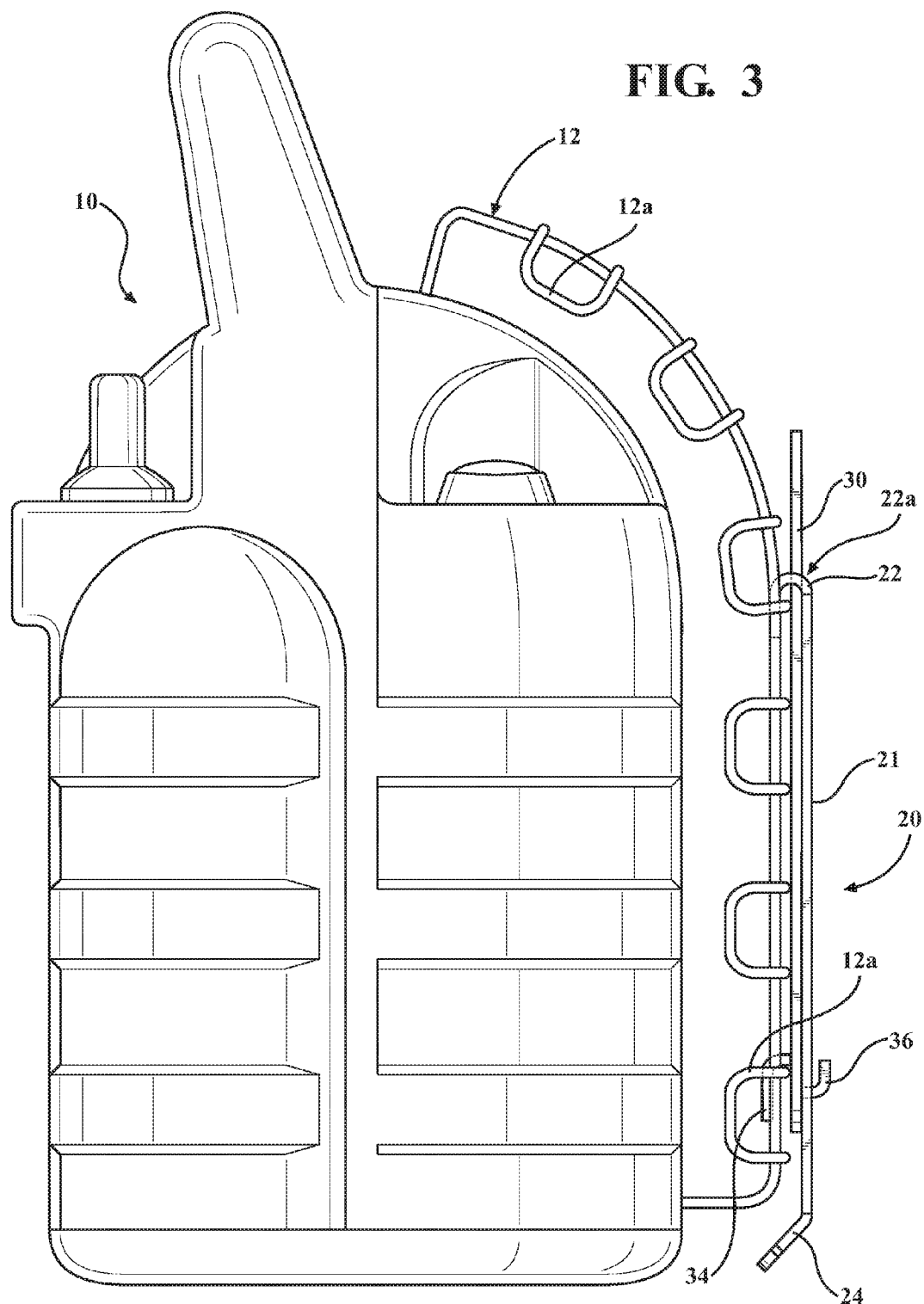
FIG. 3 is a side elevation view of the assembly of FIG. 1 stored flat on the front face of the heater.
Figure 4:
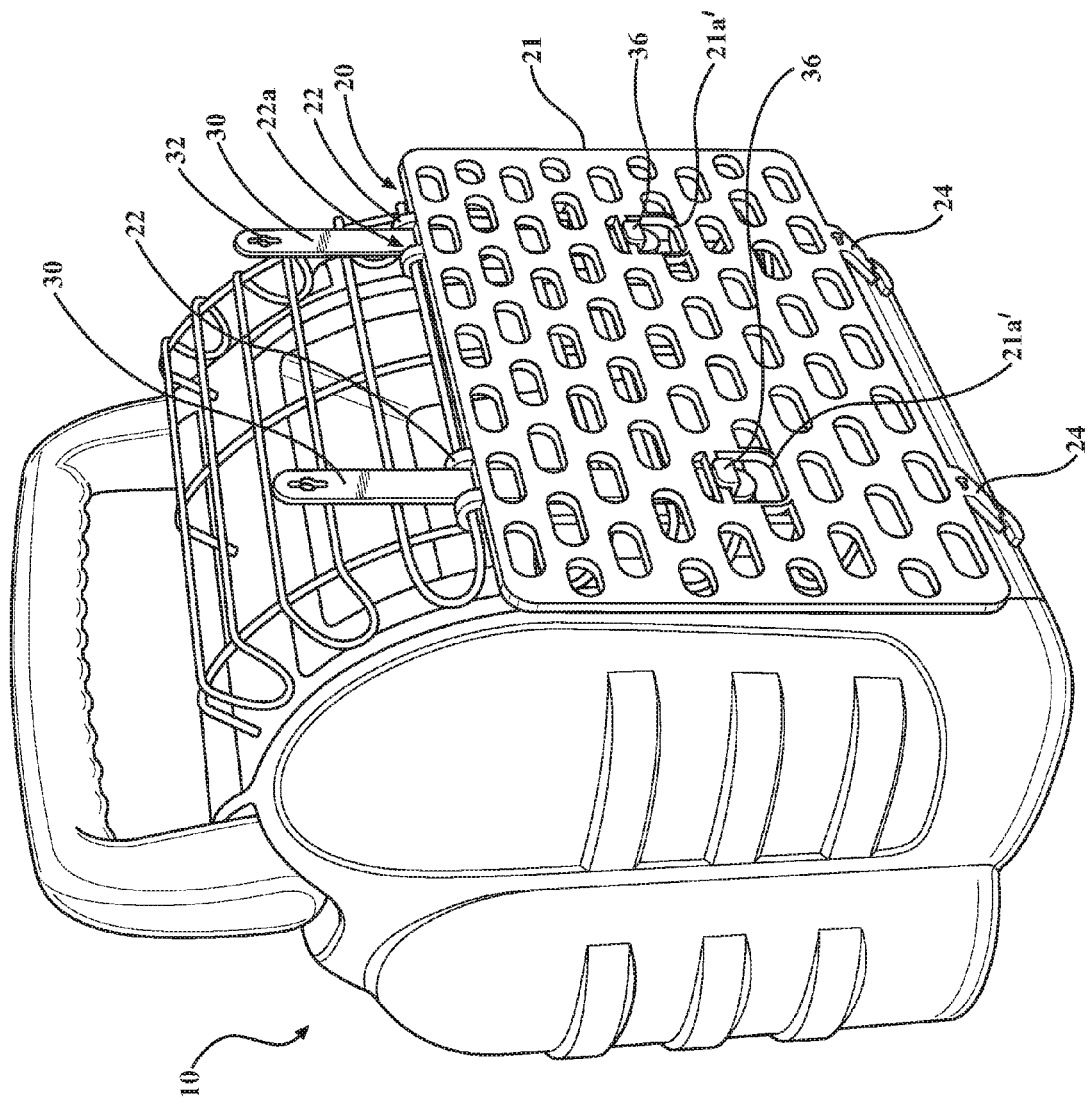
FIG. 4 is a front perspective view of the assembly of FIG. 3.
Figure 6:
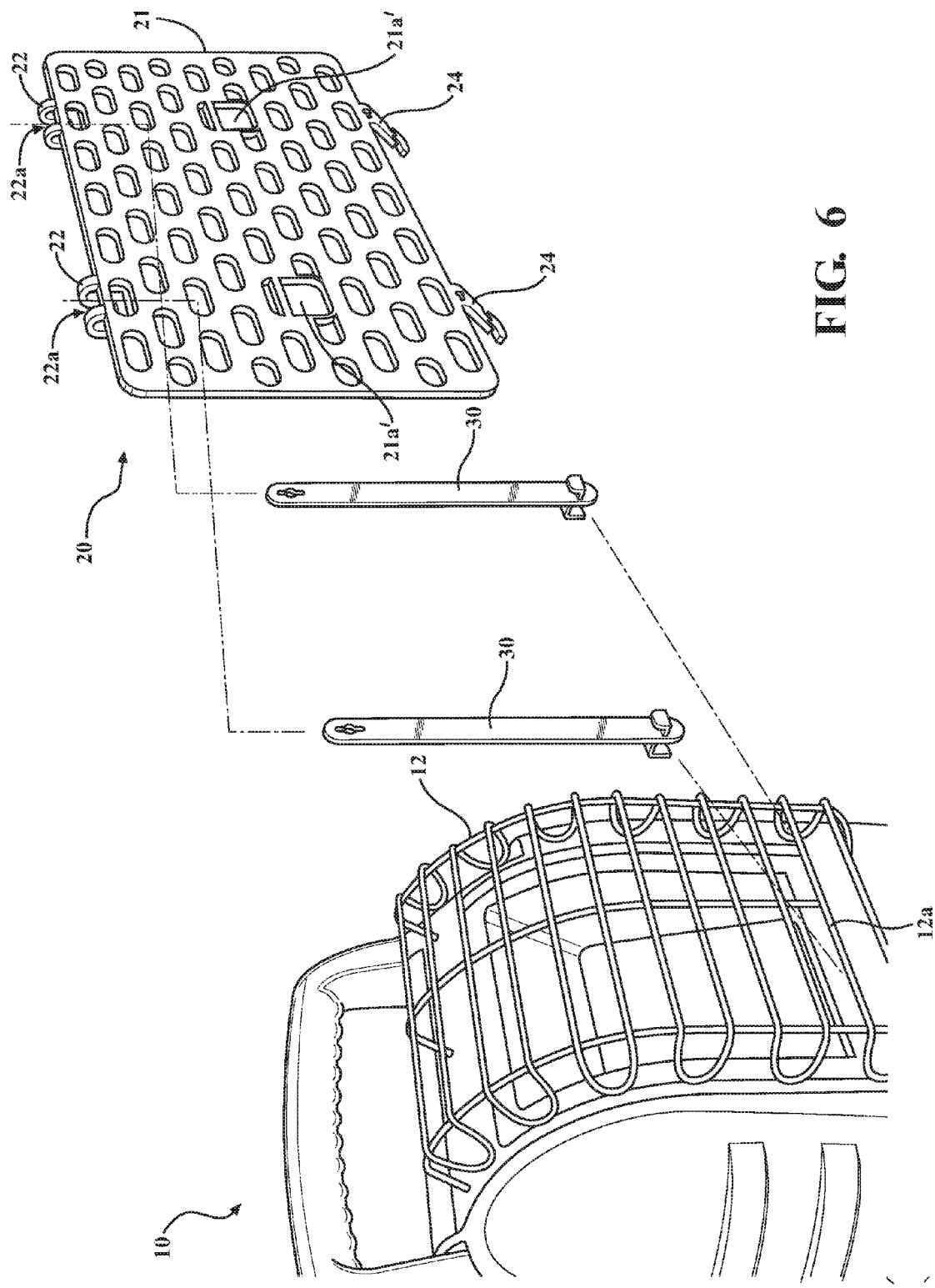
FIG. 6 is a front perspective exploded view of the assembly of FIG. 3.

Referring next to FIGS. 3, 4 and 6, grate assembly 20 can be disassembled from its horizontal deployed state in FIGS. 1 and 2 by simply reversing the order of assembly. Grate assembly 20 can then be re-attached to the front of grille 12 in a flat condition for storage or transport. To do so, the upper flat keyway ends of legs 30 are inserted through slots 22a in upper grate hooks 22, parallel to grate 21, until the outer grate support hooks 36 at the lower ends of the legs engage either the lower edge 21d of grate 21 or, as illustrated, one or more slots 21a in the grate. Slots 22a preferably extend only partway along the curved length of tab hooks 22, centered at the hook bends, in order to define apertures capable of enclosing the inserted portions of legs 30 and holding them parallel to the grate. The flat assembly comprising grate 21 and legs 30 is then hooked onto a vertical front portion of grille 12 by simultaneously engaging grate hooks 22 and inner leg hooks 34 with corresponding cross-wires 12a on grille 12. It is accordingly necessary to dimension grate 21 and legs 30 so that the space between hooks 22 on the grate and hooks 34 on the legs when the legs 30 and grate 21 are assembled in the flat configuration of FIGS. 3 and 4 corresponds to the distance between two spaced cross-wires 12a on grille 12; for this purpose the illustrated example shows two specially placed and formed enlarged slots 21a' configured to receive the lower hook ends of legs 30.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A cooking grate assembly configured for use on a portable radiant heater with a front safety grille, the cooking grate assembly comprising:
    a flat main cooking grate comprising an upper end and a lower end and a cooking surface;
    a pair of spaced hook tabs extending from the upper end of the grate and configured to engage a horizontal cross-wire on the grille;
    a pair of spaced, inwardly-angled key tabs extending from the lower end of the grate at an acute inward angle relative to the cooking surface;
    a pair of legs separable from the grate, each leg having an upper end with a keyway configured to engage a respective one of the key tabs on the grate with the leg in a first horizontal orientation, and to be longitudinally locked to the key tab with the leg in a second rotated vertical orientation, each leg further having a lower end with opposing inner and outer hooks on respective inner and outer faces of the leg; wherein,
    the inner hook on each leg opens downwardly away from the upper end of the leg, and the outer hook on each leg opens upwardly toward the upper end of the leg, the inner hooks being configured to engage a cross-wire on the grille and the outer hooks being configured to engage a lower portion of the grate.

2. A cooking grate assembly configured for use on a portable radiant heater with a front safety grille, the cooking grate assembly comprising:
    a flat main cooking grate with an upper end and a lower end and a cooking surface:
    a pair of spaced hook tabs extending from the upper end of the grate;
    a pair of spaced inwardly-angled key tabs extending from the lower end of the grate;
    a pair of legs separable from the grate, each leg having an upper end with a keyway configured to engage a respective key tab on the grate in a first horizontal orientation, and to be longitudinally locked to the key tab in a second rotated vertical orientation, each leg further having a lower end with opposing inner and outer hooks on respective inner and outer faces of the leg with the inner hook opening downwardly and the outer hook opening upwardly; wherein,
    the hook tabs extending from the upper/inner end of the grate are curved or angled downwardly and inwardly relative to the cooking surface of the grate, and further wherein each hook tab includes a slot parallel to a plane of the grate, the slot sized to receive the upper end of a respective leg therethrough in a plane parallel to the plane of the grate.

3. The cooking grate assembly of claim 2, wherein the inner hook on each leg is spaced from the upper end of the leg a distance corresponding to a lower portion of the grate when the upper end of the leg is received in the slot of a respective hook tab.

4. The cooking grate assembly of claim 3, wherein the lower portion of the grate comprises one of the lower end of the grate or an aperture in the grate between the lower end of the grate and the upper end of the grate.

5. In combination with a portable radiant heater having a front safety grille comprising a plurality of vertically spaced horizontal cross-wires and a substantially vertical front portion generally parallel to a substantially vertical radiant burner or heating element, a cooking grate assembly comprising:

a flat main cooking grate comprising an upper end and a lower end and a cooking surface;

a pair of spaced hook tabs extending from the upper end of the grate and engaging a first cross-wire on an upper end of the grille when in a deployed configuration with the cooking surface substantially horizontal relative to the vertical front portion of the grille;

a pair of spaced, inwardly-angled key tabs extending from the lower end of the grate;

a pair of legs separable from the grate, each leg having an upper end with a keyway configured to engage a respective one of the key tabs on the grate in a first lateral orientation, and further configured to be longitudinally locked to the key tab in a second rotated longitudinal orientation, each leg further having a lower end with opposing inner and outer hooks on respective inner and outer faces of the leg; wherein, the inner hooks open downwardly and the outer hooks on the legs open upwardly, and wherein the inner hooks engage a second cross-wire on a lower end of the grille spaced from the first cross-wire in the deployed configuration with the legs longitudinally locked to and angled downwardly and inwardly from their respective key tabs at an acute angle relative to the cooking surface toward the lower end of the grate.

6. The combination of claim 5, wherein the cooking grate assembly further has a stored configuration substantially flat against the vertical front portion of the grille in which the hook tabs are engaged with an upper one of the horizontal cross-wires on the vertical front portion of the grille, and in which the legs are stored in parallel with the cooking grate between the cooking grate and the grille with the upper end of each leg inserted through a slot in a respective one of the hook tabs and with the inner hooks on the lower ends of the legs engaged with a lower horizontal cross-wire on a lower portion of the vertical front portion of the grille and with the outer hooks on the lower ends of the legs engaged with a lower portion of the cooking grate.

7. The cooking grate assembly of claim 3, wherein the cooking grate has a storage configuration wherein the upper end of each leg is inserted through the slot in a respective one of the hook tabs, and further wherein the inner hook on the lower end of each leg is engaged with the one of the lower end of the grate or the aperture in the grate between the lower end of the grate and the upper end of the grate.

* * * * *